United States Patent

[11] 3,601,985

| [72] | Inventor | Louis Jules Bauger<br>Vanves, France |
|---|---|---|
| [21] | Appl. No. | 856,687 |
| [22] | Filed | Sept. 10, 1969 |
| [45] | Patented | Aug. 31, 1971 |
| [73] | Assignee | Societe Nationale D'Etude et de<br>Construction de Moteurs d'Aviation |
| [32] | Priority | Sept. 12, 1968 |
| [33] | | France |
| [31] | | 165,973 |

[54] VIBRATION DAMPING DEVICE FOR A COMBUSTION CHAMBER
3 Claims, 8 Drawing Figs.

[52] U.S. Cl. .................................................. 60/39.72 P,
431/114
[51] Int. Cl. .................................................. F02k 3/10,
F23r 1/00
[50] Field of Search .......................................... 60/39.72,
261, 39.72 P; 431/114

[56] References Cited
UNITED STATES PATENTS

| 2,865,174 | 12/1958 | Blackman | 60/39.72 |
| 2,912,825 | 11/1959 | Blackman | 60/39.72 |
| 3,054,259 | 9/1962 | Arthur | 60/39.72 |
| 3,102,392 | 9/1963 | Bauger | 60/39.72 |
| 2,616,257 | 11/1952 | Mock | 60/39.72 P |
| 2,807,931 | 10/1957 | Bodine | 60/39.72 P |

*Primary Examiner*—Douglas Hart
*Attorney*—William J. Daniel

ABSTRACT: A device for damping vibrations originating in a combustion chamber through which a gas flow is passing and which is equipped with at least one burner, said device comprising an arrangement of at least two plates spaced at an interval from one another in the neighborhood of said burner and located transversely in relation to the general direction of the gas flow, one of said plates containing orifices whilst the other does not.

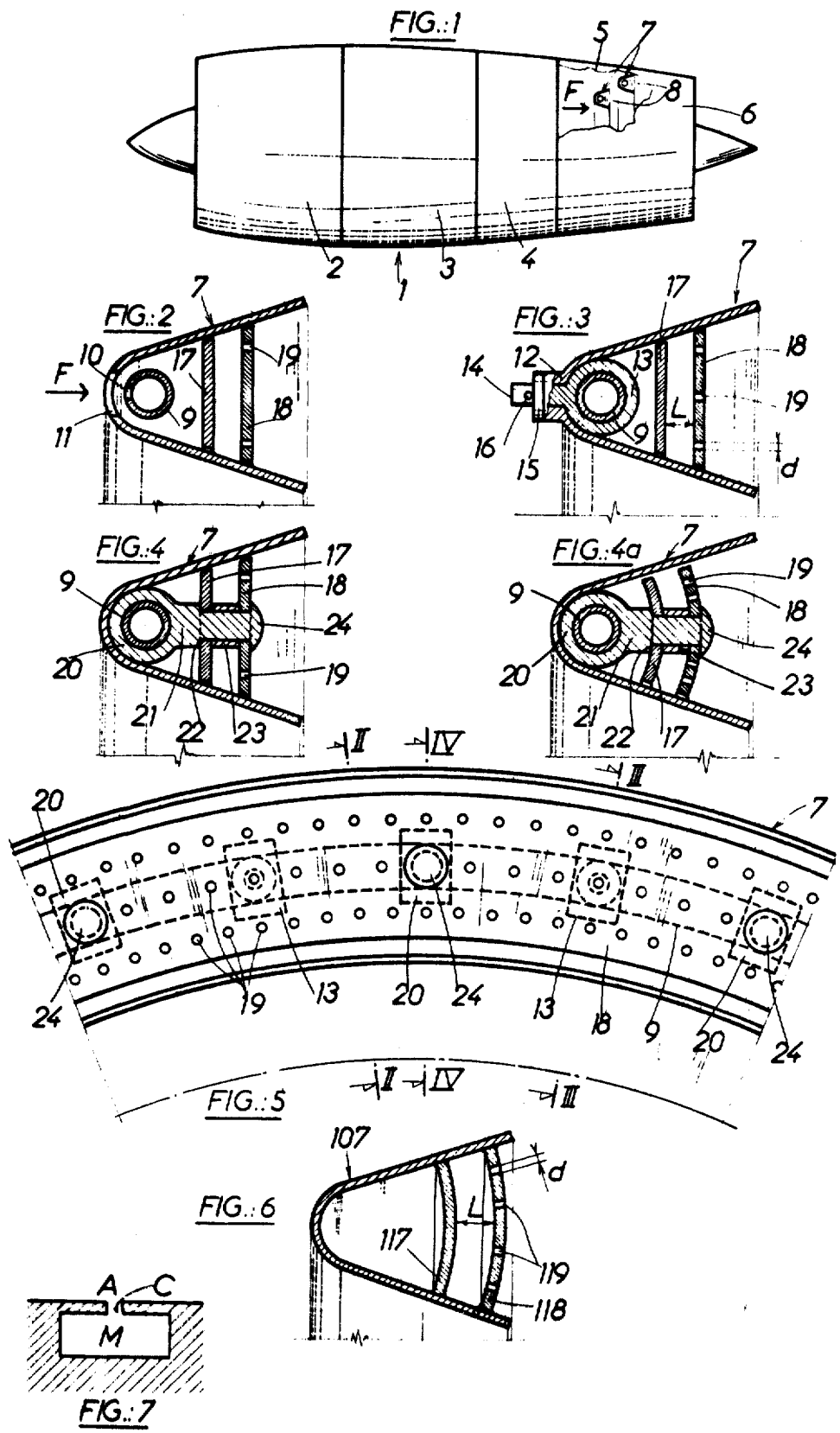

VIBRATION DAMPING DEVICE FOR A COMBUSTION CHAMBER

BACKGROUND OF THE INVENTION

In combustion chambers, in particular for gas-turbine power plants or jet engines, through which a gas flow passes and which are equipped with at least one burner in the wake of which a primary combustion zone develops, there is a strong tendency for the development of combustion vibrations.

The stabilization of the flame, in a combustion chamber through which the gas flow is subsonic, necessitates slowing of the flow in the neighborhood of the zone of introduction of the fuel whose intrinsic energy is to be converted into useful thermal energy.

This deceleration can be obtained by using one or more burners to produce local stable zones of vortex-type recirculation. The fuel is introduced into these zones and it is here (at a richness close to the stoichiometric richness in order to satisfy the stability requirement) that the primary part of the combustion takes place.

Due to the fact that the flow in the primary combustion zone is a vortex flow, and that combustion takes place at a richness close to the stoichiometric richness, it will be appreciated that this combustion may be locally discontinuous in the wake of the burner. The result is that there are produced pulsating disturbances of variable amplitude and frequency, which are a function, on the one hand, of the burner geometry (drag coefficient and dimensions) and on the other hand of the quantity of input energy. These pulsating disturbances produce in the flow local variations of static pressure which are propagated at the velocity of sound through the air or gas of which the flow is made up, in all directions, and in particular in the direction of flow and in directions perpendicular thereto.

The combustion chamber itself has a natural frequency of vibration which depends, in particular, upon its geometry and can therefore be excited to resonance if its natural frequency is the same as that of the excitatory disturbance or a harmonic thereof.

Following this hypothesis, the walls of the combustion chamber would then be subjected to a substantial stress correlated with the energy introduced into the combustion chamber, and the synchronizing factor would not be modified by damping, because the inertia of the fluid and the friction forces at work are merely second order factors.

It is true, that this kind of phenomenon occurs only very rarely in the main combustion chamber of a jet engine since, whether it be at takeoff or in flight, at high mach numbers, the richness of the fuel-air mixture on average is quite a long way away from the stoichiometric value.

This phenomenon does, on the other hand, appear quite frequently in reheat combustion chambers in which the richness is close to the stoichiometric value, and manifests itself in the form of a characteristic screeching noise accompanied by the appearance of cracks in the walls of the combustion chamber, this being followed eventually by local failure.

Theoretical studies and trials on models as well as on full-size assemblies have shown that screeching is essentially due to coupling between transverse vibrations, which occur in radial and tangential modes.

PRIOR ART

A method generally adopted to combat the destructive effect of transverse vibrations consists in lining the inside of the combustion chamber, opposite the flame stabilizers, with a wall which is coaxial with the external envelope. This wall can be corrugated and thus produce phase-shifts in the disturbing waves and/or it can contain holes in order to act as an inertia damper of the Helmholtz resonator type.

However, these devices have relatively limited efficiency and, moreover, exhibit the drawback of a high weight, which is inevitable if they are to operate reliably at high temperature.

OBJECT OF THE INVENTION

The object of the invention is to provide an antiscreech damper device which has the dual advantage, in comparison with the known devices, of improved efficiency and a considerably reduced weight.

BRIEF SUMMARY OF THE INVENTION

The damper device in accordance with the invention comprises an arrangement of at least two plates maintained at an interval from one another in the neighborhood of the burner and disposed transversely in relation to the general direction of the gas flow, one of said plates containing orifices whilst the other does not.

The assembly of these two plates, one of which is perforated, constitutes a series of elementary Helmholtz resonators located in parallel at the very source of the pulsating disturbances. The latter are thus damped at their origin.

The device in accordance with the invention thus differs substantially from certain of the known devices which likewise exploit the principle of the Helmholtz resonator but which are operative not at the point of origin but at the region of action of the disturbances within the combustion chamber, and which, consequently, are both bulkier and less effective.

FURTHER FEATURES OF THE INVENTION

In the case where the burner comprises a V-section or U-section flame stabilizer open in the direction of the general gas flow, the assembly of the two plates will advantageously be located inside said V or said U.

The latter arrangement has the advantage, furthermore, considered in the case where the stabilizer is provided in the neighborhood of the apex of the V with a fuel injector, of protecting the latter against radiation from the flame.

The damping properties of the device are a function of several parameters and notably of the distance between the plates, the thickness of said plates, and the number, distribution and diameter of the orifices. Said properties thus depend on the number, distribution and impedances of each of the elementary resonators hereinbefore referred to.

If it is desired to tune the device to several different frequencies, it is merely necessary to provide elementary radiators of different impedances, for example by using orifices whose diameters vary from one resonator to the next.

DESCRIPTION OF DRAWINGS

The practices of the invention will now be described by way of example with reference to the accompanying drawings, in which:

FIG. 1 is a schematic, partially cutaway view, through a gas turbine jet engine comprising a reheat chamber to which the invention has been applied;

FIGS. 2, 3 and 4 are axial sections, respectively on the lines II—II, III—III, IV—IV of FIG. 5, through a V-section burner ring fitted with a damper device in accordance with the invention;

FIG. 4a is a view similar to that of FIG. 4 showing a variant embodiment;

FIG. 5 is an end elevation seen from the downstream end, of the burner ring illustrated in FIGS. 2, 3, 4 and 4a;

FIG. 6 is an axial sectional view through a burner ring in accordance with a different embodiment; and FIG. 7 is an explanatory diagram relating to a Helmholtz resonator.

In FIG. 1, the general reference 1 has been used to indicate a gas turbine jet engine with a compressor 2, a main combustion chamber 3, a turbine 4, a reheat chamber 5 and a nozzle 6. The reheat chamber 5 is fitted, in a conventional manner, with one or more burner rings marked by the general reference 7, and these in the usual manner determine in their wake regions one or more primary combustion zones 8. As explained hereinbefore, these primary combustion zones are the source of instabilities of pulsating nature and these give rise to high frequency vibration phenomena normally referred to as screech, the efficient damping of which constitutes the main object of the invention.

The burner rings are of a known type and advantageously, considered in section in an axial plane, will take the form of a V or u the apex of which is directed upstream; they may or may not be equipped with an annular fuel injector 9 but FIG. 6 relates in particular to the case of a ring without such injector.

The relative arrangement of a ring 7 and an injector 9 for the fuel can be seen in FIGS. 2 to 5. The injector 9, located inside the burner ring 7, distributes the fuel into the reheat chamber in counterflow to the general direction of flow, marked by the arrow F, of the gas passing through the said chamber, such distribution taking place through injection holes 10 which are spaced at equal intervals. The jets of fuel advance upstream through holes 11 formed at the apex of the V opposite the injection holes 10. The fuel is atomized by the gas flow passing in the opposite direction and is entrained thereby, flowing around the contour of the burner ring 7 into the wake thereof where primary combustion takes place. One advantageous method of fixing the injector 9 to the inside of the V of the burner ring 7 is shown in FIGS. 3 and 5. Here, the reference 12 has been used to indicate sleeves soldered at different points on the circumference to the leading edge of the ring, and the reference 13 indicates annular fixings surrounding the injector 9, preferably with a small clearance in relation thereto. These fixings, in each case, carry a pin 14 which enters the sleeve 12 and enables the injector 9 to be fixed in position by means of a seating washer and a pin 16.

The vibration damper in accordance with the invention is constituted by two rings 17, 18 of flat (FIG. 4) or dished (FIG. 4a) form, one of which, the one closest to the primary combustion zone, contains orifices 19, whilst the other does not.

The fixing of the rings 17, 18 to the burner ring 7 can advantageously be effected by means of annular fixings 20 surrounding the injector 9 and similar to the annular fixings 13 with the exception of the pins 14, which are in this case replaced by cylindrical pins 21 directed in the downstream direction. The plates 17 and 18 possess, uniformly distributed around the diameter of the injector 9, appropriate fixing holes which are slipped over the pins 21. The upstream plate 17 is centered by shoulders 22 on the pins 21, and is spaced away from the downstream plate by ferrules 23.

Assembly is effected in the following manner; first of all the annular fixings 13 and 20 are slipped over the injector 9; subsequently the plate 17 is assembled against the shoulders 22 on the pins 21 and the ferrules 23 are then slipped on, followed by the plate 18; the downstream ends of the pins 21 are then riveted at 24 against the plate 18; the assembly constituted by the plates 17, 18 and the injector 9 is then positioned against the burner ring 7 and fixed thereto by means of the rings 13 and the pins 14 in the manner indicated hereinbefore. The profile of the annular fixings 13 and 20 is the same in both cases, so that around the whole of the periphery the same relative spacing is maintained between the burner ring 7 and the fuel injector 9.

FIG. 6, on the other hand, relates to a burner ring 107 with no injector and assembled in the same manner as the fuel injector 9 but nevertheless equipped, in accordance with the invention, with a damper constituted by two plates 117, 118 similar to the plates 17, 18. The plate 118 contains holes 119 similar to the holes 19.

The operation of the damper device in accordance with the invention is based upon the principle of the Helmholtz resonator. In this context and considering FIG. 7, it should perhaps briefly be restated that a Helmholtz resonator is constituted substantially by a volume M communicating with a vibrating fluid medium A through a passage C which has small dimensions in relation to that of said volume.

The variations in pressure in the medium A and which are transmitted through the passage C, act upon the mass of fluid filling the volume M, which volume in turn starts to vibrate but in antiphase with the incident vibration, thus creating a damping effect.

The frequency to which the resonator is tuned depends upon its acoustic impedance which, as those skilled in the art will appreciate, is a function of the dimensions of the volume M and the passage C.

The plates 17, 18 or 117, 118 define between them a substantially closed volume communicating through the orifices 19 or 119 with the vibrating medium, in the present instance the primary combustion zone which is located in the neighborhood of said plates and in which there develops the combustion vibrations which are the source of the acoustic resonance phenomena generally known as screech. Thus, these plates, together with their orifices, define a set of parallel-connected elementary Helmholtz resonators.

The vibrations thus propagated through the air coming from the primary combustion zone pass through the orifices 19 or 119 and enter the space between the annular plates 17, 18 or 117, 118, where they are damped by the mass of air entrapped between said plates.

It will be observed that this effect is applied directly to the source or cause of the excitation vibrations before the latter have had time to become amplified by resonance, and this, as those skilled in the art will appreciate, improves the efficiency of the device which, moreover, has very much reduced size and weight, since it is applied exclusively in the primary zone of the combustion chamber, by comparison with what would be required if, as in the known devices, it had to act upon the resultant amplified vibrations deriving from said excitatory vibrations and constituting the screech proper.

The impedance of each of the elementary resonators is a function of the spacing "L" between the plates and of the diameter "d" of the throat portion of the orifices 19 or 119 (see FIGS. 3 and 6).

By operating on the parameters "L" and "d;" it is possible to tune the various elementary resonators to one or several frequencies of vibration. Thus, it is possible to produce orifices 19, 119 of diameters which vary from one to the next, and to select their number and location to accord with the nature of the vibrations involved, the latter being a factor which can be determined, for example by experimentation. Another factor which should also be taken into account is the thickness of the plates, this determining their own natural frequency.

The device in accordance with the invention not only damps the pressure pulses in the flow, which pulses could otherwise give rise to damaging mechanical stresses in the components of the combustion chamber, but also ensures that these components are not the source of noise, thus facilitating the task of silencers which are designed to damp the noise produced at the nozzle or at the compressor.

It will be observed, furthermore, that this device when it is applied to burner rings incorporating a fuel injector, gives the additional advantage that it acts as a protective screen shielding the fuel injector from the direct radiation of the flame and thus preventing any abnormal heating of the fuel, something which otherwise might produce premature vaporization or possibly even chemical modification of the fuel such as coking or cracking.

It will be appreciated that the embodiments described are purely examples and are open to modification in various ways within the scope of the invention as defined by the appended claims. Thus, in particular, the number of plates is not limited to two and several damper arrangements can be fitted each with different acoustic characteristics.

I claim:

1. In a combustion chamber through which at least one gas flow is passing, a burner and vibration damping device assembly comprising a flame stabilizer of V-section or U-section open in the direction of gas flow; at least two plates mounted in predetermined spaced relation inside the flame stabilizer with their flat surfaces extending generally transversely to the general direction of said gas flow, one of said plates being imperforate and the other perforated with at least one orifice of predetermined dimension.

2. A combustion chamber according to claim 1, wherein a plurality of orifices of varying dimensions are provided in said perforated plate.

3. In a combustion chamber through which at least one gas flow is passing and which is provided with at least one burner, a vibration damping device comprising at least two plates, one plate being imperforate and another plate being perforated with orifices having varying dimensions, and means mounting said plates in predetermined spaced relation in the neighborhood of the burner with their flat surfaces extending generally transversely to the general direction of said gas flow.